United States Patent
Yeo et al.

(10) Patent No.: US 9,113,158 B2
(45) Date of Patent: Aug. 18, 2015

(54) METHOD OF DRIVING DISPLAY PANEL AND DISPLAY APPARATUS FOR PERFORMING THE METHOD

(75) Inventors: Jang-Hyun Yeo, Seoul (KR); Jae-Wan Park, Seoul (KR); Jung-Hwan Cho, Asan-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 393 days.

(21) Appl. No.: 13/242,274

(22) Filed: Sep. 23, 2011

(65) Prior Publication Data

US 2012/0293495 A1 Nov. 22, 2012

(30) Foreign Application Priority Data

May 18, 2011 (KR) .................... 10-2011-0046752

(51) Int. Cl.
    G09G 3/36 (2006.01)
    H04N 13/04 (2006.01)
    H04N 13/00 (2006.01)
    H04N 13/02 (2006.01)

(52) U.S. Cl.
    CPC ......... *H04N 13/0438* (2013.01); *G09G 3/3614* (2013.01); *H04N 13/0033* (2013.01); *H04N 13/0285* (2013.01)

(58) Field of Classification Search
    CPC .................................................. G09G 3/3614
    USPC .............................................. 348/51; 345/96
    See application file for complete search history.

(56) References Cited

U.S. PATENT DOCUMENTS

| | | | |
|---|---|---|---|
| 6,327,008 B1* | 12/2001 | Fujiyoshi | 349/106 |
| 2001/0052887 A1 | 12/2001 | Tsutsui et al. | |
| 2004/0135940 A1* | 7/2004 | Tsunekawa et al. | 349/110 |
| 2005/0219188 A1* | 10/2005 | Kawabe et al. | 345/94 |
| 2006/0012593 A1* | 1/2006 | Iriguchi et al. | 345/204 |
| 2006/0114207 A1* | 6/2006 | Lee et al. | 345/89 |
| 2006/0145978 A1* | 7/2006 | Takatori et al. | 345/87 |
| 2006/0267889 A1* | 11/2006 | Kimura | 345/84 |
| 2006/0267910 A1* | 11/2006 | Lin et al. | 345/100 |
| 2007/0057905 A1 | 3/2007 | Johnson et al. | |
| 2007/0097056 A1* | 5/2007 | Tseng | 345/96 |
| 2007/0229432 A1* | 10/2007 | Kimura | 345/96 |

(Continued)

FOREIGN PATENT DOCUMENTS

| | | |
|---|---|---|
| KR | 100859694 | 9/2008 |
| KR | 10-2010-0056361 | 5/2010 |

OTHER PUBLICATIONS

Extended European Search Report for Application No. 11191441.2-1902/2525583 dated Apr. 23, 2014.

*Primary Examiner* — Christopher S Kelley
*Assistant Examiner* — Deirdre Beasley
(74) *Attorney, Agent, or Firm* — Cantor Colburn LLP

(57) ABSTRACT

A method of driving a display panel includes outputting a data voltage of a first-eye data frame to a plurality of data lines of the display panel in a first normal frame, and outputting a partial line data voltage of the first-eye data frame to a first partial line of the plurality of data lines of the display panel in a first partial frame, where a polarity of the partial line data voltage of the first-eye data frame in the first partial frame is substantially the same as a polarity of the data voltage of the first-eye data frame outputted to the first partial line of the plurality of data lines in the first normal frame, and where an interval of the first partial frame is less than an interval of the first normal frame.

18 Claims, 11 Drawing Sheets

(56) References Cited

U.S. PATENT DOCUMENTS

| | | | |
|---|---|---|---|
| 2008/0079675 A1* | 4/2008 | Yang et al. | 345/87 |
| 2009/0102993 A1* | 4/2009 | Choi et al. | 349/37 |
| 2009/0167664 A1* | 7/2009 | Song et al. | 345/94 |
| 2009/0284671 A1* | 11/2009 | Leister | 349/18 |
| 2010/0207861 A1* | 8/2010 | Chang et al. | 345/90 |
| 2010/0245335 A1* | 9/2010 | Kimura et al. | 345/213 |
| 2010/0246750 A1* | 9/2010 | Kimura et al. | 377/64 |
| 2010/0265222 A1* | 10/2010 | Tsuboi et al. | 345/205 |
| 2010/0265279 A1* | 10/2010 | Lee | 345/690 |
| 2011/0050553 A1* | 3/2011 | Takada et al. | 345/96 |
| 2011/0187705 A1* | 8/2011 | Lan et al. | 345/419 |
| 2011/0221870 A1* | 9/2011 | Huang | 348/51 |
| 2011/0316989 A1* | 12/2011 | Imai et al. | 348/51 |
| 2012/0062532 A1* | 3/2012 | Watanabe | 345/204 |

\* cited by examiner

FIG. 7A

<Normal Frame>_1+2 dot inversion

| + | − | + | − | + | − | + | − | + | − | + |
|---|---|---|---|---|---|---|---|---|---|---|
| − | + | − | + | − | + | − | + | − | + | − |
| − | + | − | + | − | + | − | + | − | + | − |
| + | − | + | − | + | − | + | − | + | − | + |
| + | − | + | − | + | − | + | − | + | − | + |
| − | + | − | + | − | + | − | + | − | + | − |
| − | + | − | + | − | + | − | + | − | + | − |
| + | − | + | − | + | − | + | − | + | − | + |
| + | − | + | − | + | − | + | − | + | − | + |

<Partial Frame_ODD>

| + | − | + | − | + | − | + | − | + | − | + |
|---|---|---|---|---|---|---|---|---|---|---|
|   |   |   |   |   |   |   |   |   |   |   |
| − | + | − | + | − | + | − | + | − | + | − |
|   |   |   |   |   |   |   |   |   |   |   |
| + | − | + | − | + | − | + | − | + | − | + |
|   |   |   |   |   |   |   |   |   |   |   |
| − | + | − | + | − | + | − | + | − | + | − |
|   |   |   |   |   |   |   |   |   |   |   |
| + | − | + | − | + | − | + | − | + | − | + |

<Partial Frame_EVEN>

|   |   |   |   |   |   |   |   |   |   |   |
|---|---|---|---|---|---|---|---|---|---|---|
| − | + | − | + | − | + | − | + | − | + | − |
|   |   |   |   |   |   |   |   |   |   |   |
| + | − | + | − | + | − | + | − | + | − | + |
|   |   |   |   |   |   |   |   |   |   |   |
| − | + | − | + | − | + | − | + | − | + | − |
|   |   |   |   |   |   |   |   |   |   |   |
| + | − | + | − | + | − | + | − | + | − | + |
|   |   |   |   |   |   |   |   |   |   |   |

<Normal Frame>_1 dot inversion

| + | − | + | − | + | − | + | − | + | − | + |
|---|---|---|---|---|---|---|---|---|---|---|
| − | + | − | + | − | + | − | + | − | + | − |
| + | − | + | − | + | − | + | − | + | − | + |
| − | + | − | + | − | + | − | + | − | + | − |
| + | − | + | − | + | − | + | − | + | − | + |
| − | + | − | + | − | + | − | + | − | + | − |
| + | − | + | − | + | − | + | − | + | − | + |
| − | + | − | + | − | + | − | + | − | + | − |
| + | − | + | − | + | − | + | − | + | − | + |

FIG. 8B

<Partial Frame_ODD>

FIG. 8C

<Partial Frame_EVEN>

FIG. 9A

<Normal Frame>_2 dot inversion

| + | − | + | − | + | − | + | − | + |
|---|---|---|---|---|---|---|---|---|
| + | − | + | − | + | − | + | − | + |
| − | + | − | + | − | + | − | + | − |
| − | + | − | + | − | + | − | + | − |
| + | − | + | − | + | − | + | − | + |
| + | − | + | − | + | − | + | − | + |
| − | + | − | + | − | + | − | + | − |
| − | + | − | + | − | + | − | + | − |
| + | − | + | − | + | − | + | − | + |

<Partial Frame_ODD>

<Partial Frame_EVEN>

<Normal Frame>_Column inversion

| + | - | + | - | + | - | + | - | + | - | + |
|---|---|---|---|---|---|---|---|---|---|---|
| + | - | + | - | + | - | + | - | + | - | + |
| + | - | + | - | + | - | + | - | + | - | + |
| + | - | + | - | + | - | + | - | + | - | + |
| + | - | + | - | + | - | + | - | + | - | + |
| + | - | + | - | + | - | + | - | + | - | + |
| + | - | + | - | + | - | + | - | + | - | + |
| + | - | + | - | + | - | + | - | + | - | + |
| + | - | + | - | + | - | + | - | + | - | + |

<Partial Frame_ODD>

<Partial Frame_EVEN>

~100

METHOD OF DRIVING DISPLAY PANEL AND DISPLAY APPARATUS FOR PERFORMING THE METHOD

This application claims priority to Korean Patent Application No. 2011-0046752, filed on May 18, 2011, and all the benefits accruing therefrom under 35 U.S.C. §119, the content of which in its entirety is herein incorporated by reference.

BACKGROUND OF THE INVENTION

1. Field of the Invention

Exemplary embodiments of the invention relate to a method of driving a display panel and a display apparatus for performing the method of driving the display panel. More particularly, exemplary embodiments of the invention relate to a method of driving a display panel with improved display quality and a display apparatus for performing the method.

2. Description of the Related Art

A liquid crystal display ("LCD") apparatus typically displays a two-dimensional ("2D") image. The LCD apparatus that displays a three-dimensional ("3D") stereoscopic image has been developed as demands for the 3D stereoscopic image increase in various industrial fields such as games and movies, for example.

Generally, the 3D stereoscopic image display apparatus displays the 3D stereoscopic image using a principle of binocular parallax through two eyes of human. For example, since two eyes of human are spaced apart from each other, images viewed at the different angles are inputted to the brain of human. Thus, the observer may watch the 3D stereoscopic image to recognize the stereoscopic image through the display apparatus.

The stereoscopic image display apparatus is classified into a stereoscopic type with an extra spectacle and an auto-stereoscopic type without the extra spectacle. The stereoscopic type includes a passive polarized glasses method with polarized filters having different polarized axis corresponding to two eyes, respectively, and an active shutter glasses method. In the active shutter glasses method, a left-eye image and a right-eye image are temporally divided to be periodically displayed, and a view wears a pair of glasses which sequentially open or close a left-eye shutter and a right-eye shutter, respectively, synchronized with the displaying periods of the left and right eye images.

The 3D stereoscopic image display apparatus of the active shutter glasses method outputs left-eye image data or right-eye image data to a display panel during an active period of a frame and selectively opens and closes the left-eye shutter and the right-eye shutter of the glasses during a vertical blanking period of the frame.

The 3D stereoscopic image display apparatus using the passive polarized glasses method or the active shutter glasses method has been developed to improve display quality by preventing a crosstalk, a flicker, a vertical line pattern and a horizontal line pattern, for example.

BRIEF SUMMARY OF THE INVENTION

Exemplary embodiments of the invention provide a method of driving a display panel with improved display quality of a three-dimensional ("3D") stereoscopic image.

Exemplary embodiments of the invention also provide a display apparatus for performing the method of driving the display panel.

According to an exemplary embodiment of the invention, a method of driving a display panel includes outputting a data voltage of a first-eye data frame to a plurality of data lines of the display panel in a first normal frame, and outputting a partial line data voltage of the first-eye data frame to a first partial line of the plurality of data lines of the display panel in a first partial frame, where a polarity of the partial line data voltage of the first-eye data frame in the first partial frame is substantially the same as a polarity of the data voltage of the first-eye data frame outputted to the first partial line of the plurality of data lines in the first normal frame, and where an interval of the first partial frame is less than an interval of the first normal frame.

In an exemplary embodiment, the method of driving the display panel may further include outputting a data voltage of a second-eye data frame to the plurality of data lines of the display panel in a second normal frame, and outputting a partial line data voltage of the second-eye data frame to a second partial line of the plurality of data lines of the display panel in a second partial frame, where the second normal frame and the second partial frame correspond to the first normal frame and the first partial frame, respectively, and where a polarity of the partial line data voltage of the second-eye data frame in the second partial frame is substantially the same as a polarity of the data voltage of the second-eye data frame outputted to the second partial line of the plurality of data lines in the second normal frame.

In an exemplary embodiment, the method of driving the display panel may further include generating a reversal signal having a phase reversed on a frame-by-frame basis, where the frame includes the first normal frame, the first partial frame, the second normal frame and the second partial frame, and where the reversal signal controls the polarity of the data voltage.

In an exemplary embodiment, a phase of the reversal signal in the first normal frame may be substantially equal to a phase of the reversal signal in the second normal frame, and a phase of the reversal signal in the first partial frame may be substantially equal to a phase of the reversal signal in the second partial frame.

In an exemplary embodiment, the reversal signal may have a phase corresponding to a 1+2 dot inversion mode in the first and second normal frames, and the reversal signal may have a phase corresponding to a one dot inversion mode in the first and second partial frames.

In an exemplary embodiment, the reversal signal may have a phase corresponding to a one dot inversion mode in the first and second normal frames, and the reversal signal may have a phase corresponding to a column inversion mode in the first and second partial frames.

In an exemplary embodiment, the reversal signal has a phase corresponding to a two dot inversion mode in the first and second normal frames, and the reversal signal may have a phase corresponding to a 1 dot inversion mode in the first and second partial frames.

In an exemplary embodiment, the reversal signal may have a phase corresponding to a column inversion mode in the first and second normal frames, and the reversal signal may have a phase corresponding to a column inversion mode in the first and second partial frames.

According to another exemplary embodiment of the invention, a display apparatus includes a display panel including a plurality of data lines and a plurality of gate lines crossing the plurality of data lines and a data driving part which outputs a data voltage of a first-eye data frame to the plurality of data lines of the display panel in a first normal frame, and outputs a partial line data voltage of the first-eye data frame to a first partial data line of the plurality of data lines of the display panel, where a polarity of the partial line data voltage of the first-eye data frame in the first partial frame is substantially the same as a polarity of the voltage of the first-eye data frame outputted to the first partial line of the plurality of data lines in the first normal frame, and where an interval of the first partial frame is less than an interval of the first normal frame.

In an exemplary embodiment, the data driving part may output a data voltage of a second-eye data frame to the plurality of data lines of the display panel in a second normal frame, and the data driving part may output a partial line data voltage of the second-eye data frame to a second partial line of the plurality of data lines in a second partial frame, where the second normal frame and the second partial frame correspond to the first normal frame and the first partial frame, respectively, and where a polarity of the partial line data voltage of the second-eye data frame in the second partial frame is substantially the same as a polarity of the data voltage of the second-eye data frame outputted to the second partial line of the plurality of data lines in the second normal frame.

In an exemplary embodiment, the display apparatus may further include a timing control part which generates a reversal signal having a phase reversed on a frame-by-frame basis, where the frame includes the first normal frame, the first partial frame, the second normal frame and the second partial frame, where the data driving part controls the polarity of the data voltage based on the reversal signal.

In an exemplary embodiment, a phase of the reversal signal in the first normal frame may be substantially equal to a phase of the reversal signal in the second normal frame, and a phase of the reversal signal in the first partial frame may be substantially equal to a phase of the reversal signal in the second partial frame.

In an exemplary embodiment, the display apparatus may further include a gate driving part which outputs a plurality of gate signals to the plurality of gate lines, where the gate driving part includes a first sub gate circuit which outputs an odd-numbered gate signal to ne odd-numbered gate line of the plurality of gate lines, and a second sub gate which outputs an even-numbered gate signal to an even-numbered gate line of the plurality of gate lines.

In an exemplary embodiment, the timing control part may provide a vertical start signal to the gate driving part during an early period of each of the first normal frame, the first partial frame, the second normal frame and the second partial frame.

In an exemplary embodiment, during each of the first and second normal frames, the timing control part may provide a first clock signal and a second clock signal to the first sub gate circuit, and a third clock signal and a fourth clock signal to the second sub gate circuit, where a phase of the first clock signal and a phase of the second clock signal are opposite to each other, and a phase of the third clock signal and a phase of the fourth clock signal are opposite to each other.

In an exemplary embodiment, during each of the first and second partial frames, the timing control part may provide the first and second clock signals to the first sub gate circuit, or provides the third and fourth clock signals to the second sub gate circuit.

According to exemplary embodiments of the invention, when the display apparatus is in the 3D stereoscopic image mode, the reversal signal controls a polarity of a data voltage charged in the partial frame to be substantially equal to a polarity of the data voltage charged in the normal frame such that display quality is substantially improved by effectively preventing deterioration in the display quality, such as a flicker and a horizontal line pattern, for example, which may occur due to a view difference between an image displayed during the normal frame and an image displayed during the partial frame.

BRIEF DESCRIPTION OF THE DRAWINGS

The above and other features of the invention will become more apparent by describing in detailed exemplary embodiments thereof with reference to the accompanying drawings, in which:

FIGS. 7A, 7B and 7C are schematic diagrams illustrating an exemplary embodiment of a method of driving a display panel shown in FIG. 1;

FIGS. 8A, 8B and 8C are schematic diagrams illustrating an alternative exemplary embodiment of a method of driving a display panel according the invention;

FIGS. 9A, 9B and 9C are schematic diagrams illustrating another alternative exemplary embodiment of a method of driving a display panel according to the invention; and FIGS. 10A, 10B and 10C are schematic diagrams illustrating still another alternative exemplary embodiment of a method of driving a display panel according to the invention.

DETAILED DESCRIPTION OF THE INVENTION

Figure 1:
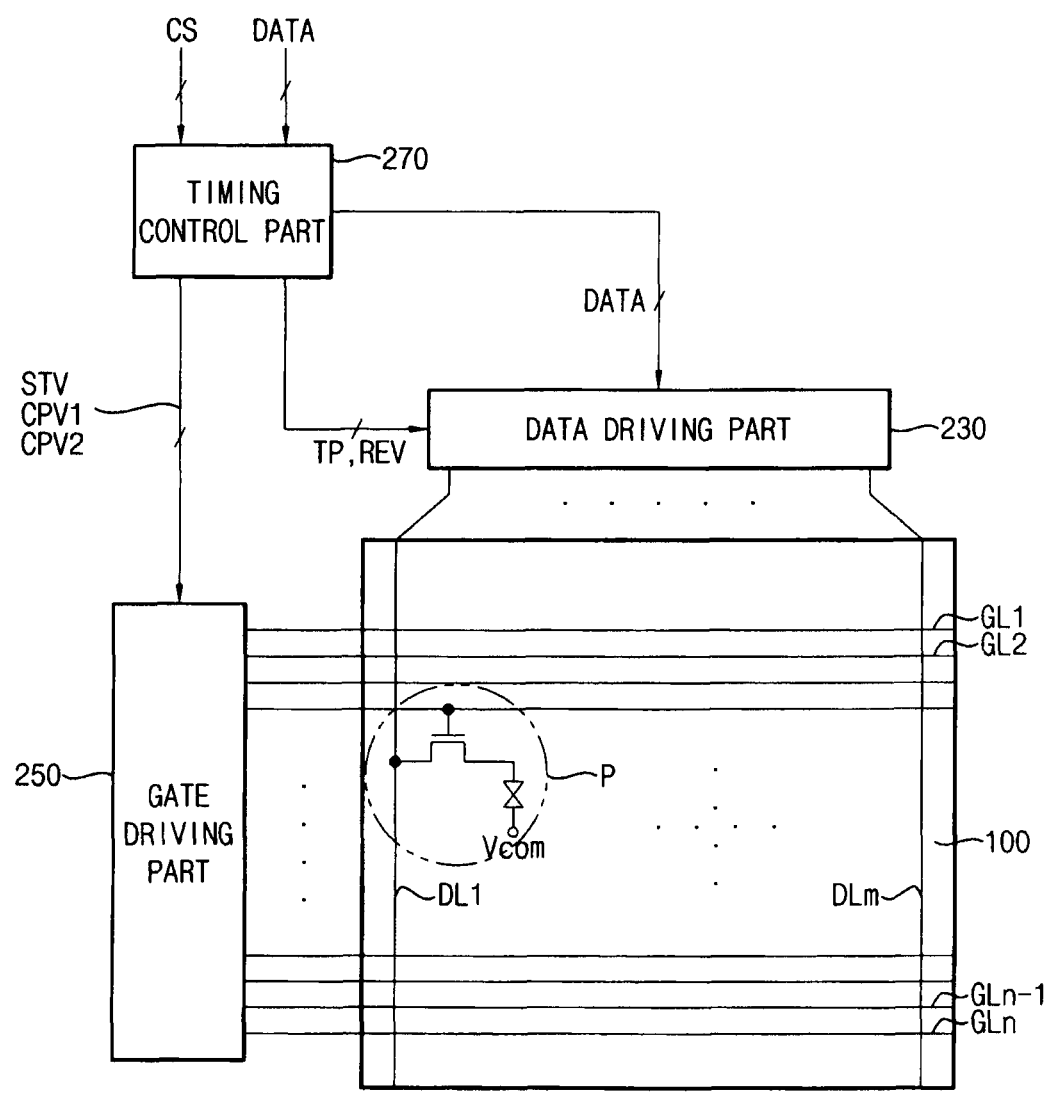
FIG. 1 is a block diagram illustrating an exemplary embodiment of a display apparatus according to the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the invention will be explained in detail with reference to the accompanying drawings.

Figure 2A:
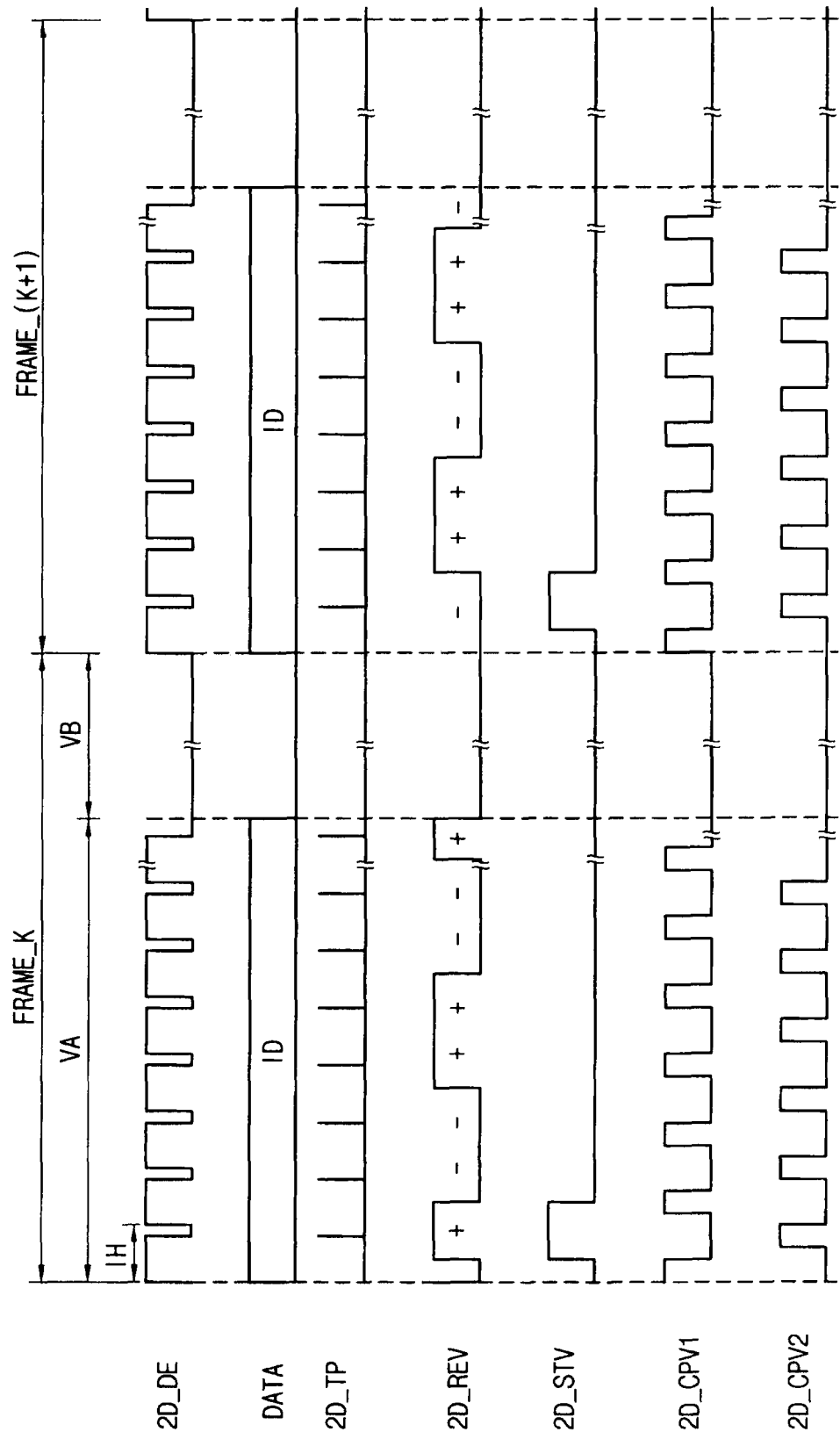
FIGS. 2A and 2B are signal timing diagrams illustrating input and output signals of an exemplary embodiment of a timing control part shown in FIG. 1.
Figure 2B:
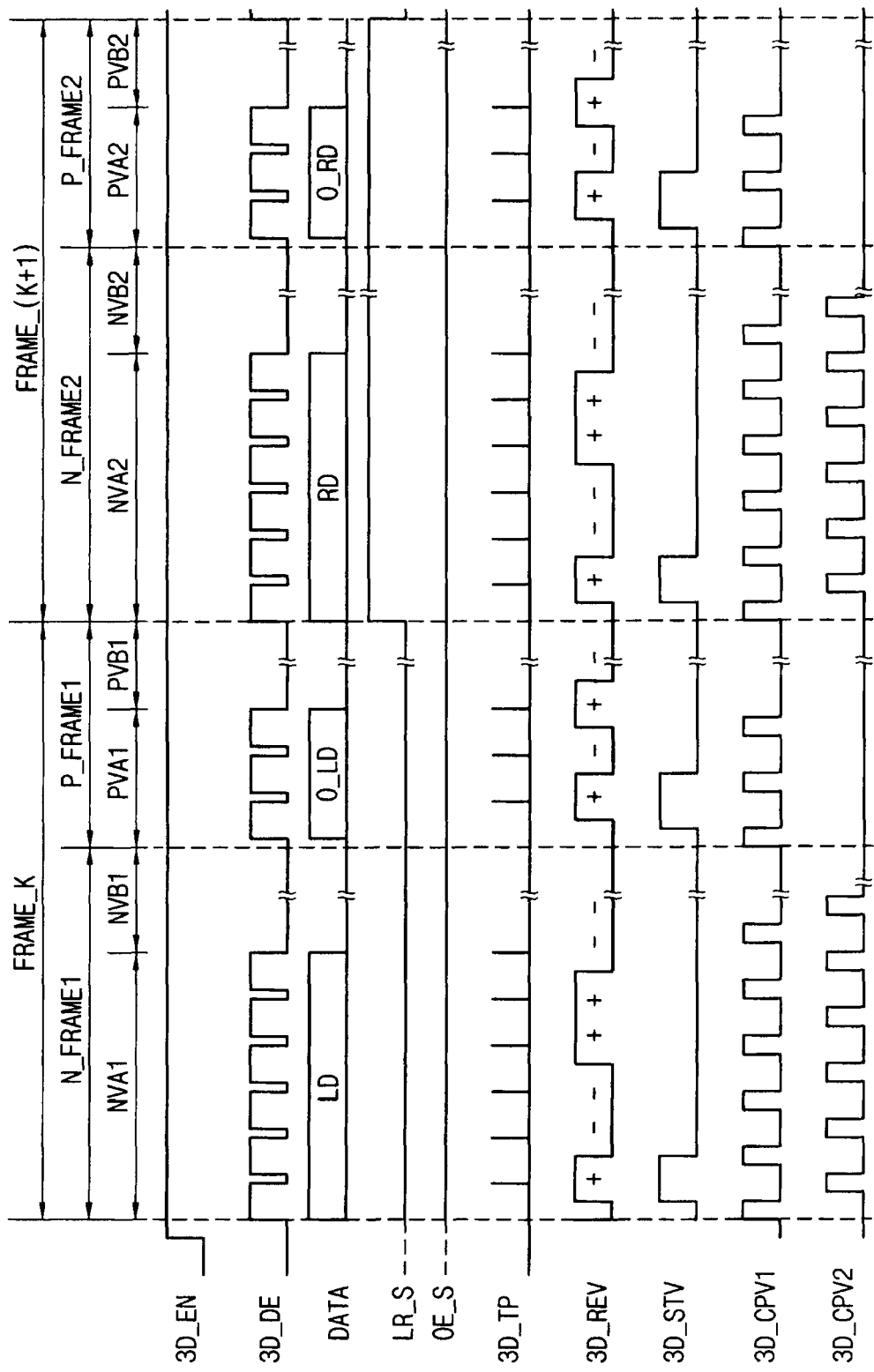

FIG. 1 is a block diagram illustrating an exemplary embodiment of a display apparatus according to the invention. FIGS. 2A and 2B are signal timing diagrams illustrating input and output signals of an exemplary embodiment of a timing control part shown in FIG. 1.

Referring to FIGS. 1, 2A and 2B, the display apparatus includes a display panel 100, a data driving part 230, a gate driving part 250 and a timing control part 270.

The display panel 100 includes a plurality of data lines DL1, . . . , DLm, a plurality of gate lines GL, GL2, . . . , GLn crossing the data lines DL1, . . . , DLm, and a plurality of pixels (n and m are natural numbers).

The data driving part 230 provides a plurality of data voltages to the data lines DL1, . . . , DLm.

The gate driving part 250 provides a plurality of gate signals to the gate lines GL1, GL2, . . . , GLn.

The timing control part 270 receives an original control signal CS and a data signal DATA from outside. The timing control part 270 generates a data control signal and a gate control signal to control the data driving part 230 and the gate driving part 250 based on the original control signal CS. The timing control part 270 provides the data signal DATA to the data driving part 230.

The original control signal CS includes a three-dimensional ("3D") enable signal 3D_EN, a data enable signal, which is one of a two-dimensional ("2D") data enable signal 2D_DE and a 3D data enable signal 3D_DE, a left-right identification signal LR_S and an odd-even identification signal OE_S, for example. The data control signal includes a load signal TP and a reversal signal REV, for example. The gate control signal includes a vertical start signal STV, a first gate clock signal CPV1 and a second gate clock signal CPV2, for example.

Referring to FIG. 2A, when the display apparatus is in a 2D image mode, the timing control part 270 receives the 2D data enable signal 2D_DE, a 2D image data ID in synchronization with the 2D data enable signal 2D_DE. In one exemplary embodiment, for example, the 2D data enable signal 2D_DE may have a frequency of 120 hertz (Hz).

In the 2D image mode, the timing control part 270 generates a 2D load signal 2D_TP, a 2D reversal signal 2D_REV, a 2D vertical start signal 2D_STV, a first 2D gate clock signal 2D_CPV1 and a second 2D gate clock signal 2D_CPV2 based on the 2D data enable signal 2D_DE.

In the 2D image mode, a K-th frame FRAME_K includes a vertical active period VA and a vertical blanking period VB. The vertical active period VA is a period in which the 2D data enable signal 2D_DE is activated, and the vertical blanking period VB is a period in which the 2D data enable signal 2D_DE is deactivated (K is a natural number).

The 2D load signal 2D_TP controls an output timing of a data voltage which is an output signal of the data driving part 230 in synchronization with the 2D data enable signal 2D_DE.

The 2D reversal signal 2D_REV controls a polarity of the data voltage. In one exemplary embodiment, for example, when the 2D reversal signal 2D_REV is at a high level, the data voltage may have a positive polarity (+) with respect to a reference voltage. In such an embodiment, when the 2D reversal signal 2D_REV is at a low level, the data voltage may have a negative polarity (−) with respect to the reference voltage.

The 2D reversal signal 2D_REV has a phase reversed every unit frame. In one exemplary embodiment, for example, when an inversion mode is a 1+2 dot inversion mode, the 2D reversal signal 2D_REV of a K-th frame FRAME_K has the high level in a first horizontal period and has alternately one of the low level and the high level every two horizontal periods in the remaining horizontal periods, e.g., in a sequence of high level, low level, low level, high level, high level, low level, low level, . . . , high level. The 2D reversal signal 2D_REV of a (K+1)-th frame FRAME_K+1 has a phase opposite to the phase of the 2D reversal signal 2D_REV of the K-th frame FRAME_K, that is, the 2D reversal signal 2D_REV of the (K+1)-th frame FRAME_K+1 has the low level in the first horizontal period and has alternately one of the high level and the low level every two horizontal periods in the remaining horizontal periods, e.g., in a sequence of low level, high level, high level, low level, low level, high level, high level, . . . , low level. In one exemplary embodiment, for example, voltages in a polarity sequence of positive (+), negative (−), negative (−), positive (+), positive (+), negative (−), negative (−), . . . , positive (+) may be applied to pixels included in an M-th pixel column during the K-th frame FRAME_K based on the 2D reversal signal 2D_REV (M is a natural number). In such an embodiment, voltages in a polarity sequence of negative (−), positive (+), positive (+), negative (−), negative (−), positive (+), positive (+), . . . , negative (−) may be applied to pixels included in the M-th pixel column during the (K+1)-th frame FRAME_K+1.

The 2D vertical start signal 2D_STV has a frame cycle, and controls a start timing of the gate driving part 250. The 2D vertical start signal 2D_STV has a pulse of a high level during an early period of each of the K-th frame FRAME_K and the (K+1)-th frame FRAME_(K+1).

The first 2D gate clock signal 2D_CPV1 is a control signal to generate odd-numbered gate signals. The second 2D gate clock signal 2D_CPV2 is a control signal delayed with respect to the first 2D gate clock signal 2D_CPV1 to generate even-numbered gate signals. The first and second 2D gate clock signals 2D_CPV1 and 2D_CPV2 are activated in the vertical active period VA in synchronization with the 2D data enable signal 2D_DE.

Referring to FIG. 2B, when the display apparatus is in a 3D stereoscopic image mode, the timing control part 270 receives a 3D data enable signal 3D_DE, a left-right identification signal LR_S, an odd-even identification signal OE_S and 3D stereoscopic image data. The 3D data enable signal 3D_DE may have a frequency of 180 Hz.

The 3D stereoscopic image data includes first-eye data, first-eye partial line data, second-eye data and second-eye partial line data. In an exemplary embodiment, the first-eye may be a left-eye and the second-eye may be a right-eye. Hereinafter, the first-eye will be referred to as the left-eye and the second-eye will be referred to as the right-eye.

The partial line data may be one of odd-numbered line data and even-numbered line data among a data frame of a unit frame based on the odd-even identification signal OE_S. In one exemplary embodiment, for example, when the odd-even identification signal OE_S is at the low level, the partial line data is the odd-numbered line data, and when the odd-even identification signal OE_S is at high level, the partial line data is even-numbered line data.

The timing control part 270 generates a 3D load signal 3D_TP, a 3D reversal signal 3D_REV, a 3D vertical start signal 3D_STV, a first 3D gate clock signal 3D_CPV1 and a second 3D gate clock signal 3D_CPV2 based on the 3D data enable signal 3D_DE.

In the 3D stereoscopic image mode, the K-th frame FRAME_K is temporally divided into a first normal frame N_FRAME1 and a first partial frame P_FRAME1. In one exemplary embodiment, for example, the first normal frame N_FRAME1 is a period corresponding to the vertical active period VA in the 2D image mode shown in FIG. 2A, and has a first normal active period NVA1 and a first normal blanking period NVB1. The first normal active period NVA1 may be a period in which the 3D data enable signal 3D_DE is activated, and the left-eye data LD is processed based on the left-right identification signal LR_S. In one exemplary embodiment, the first normal frame N_FRAME1 may have a frequency of 180 Hz.

The first partial frame P_FRAME1 is a period corresponding to the vertical blanking period VB in the 2D image mode, and has a first partial active period PVA1 and a first partial blanking period PVB1. The first partial active period PVA1 is a period in which the 3D data enable signal 3D_DE is activated and the left-eye odd-numbered line data O_LD is processed based on the odd-even identification signal OE_S. In one exemplary embodiment, the first partial frame P_FRAME1 may have a frequency of 360 Hz.

The first normal active period NVA1 may be a period in which the left-eye data frame is processed, and the first partial active period PVA1 is a period in which the odd-numbered or the even-numbered line data of the left-eye data frame is processed. The first normal blanking period NVB1 and the first partial frame P_FRAME1 may be a period in which a left-eye shutter of shutter glasses is open and a right-eye shutter of the shutter glasses is closed.

The (K+1)-th frame FRAME_(K+1) is temporally divided into a second normal frame N_FRAME2 and a second partial frame P_FRAME2. The second normal frame N_FRAME2 has a second normal active period NVA2 and a second normal blanking period NVB2. The right-eye data RD are processed based on the left-right identification signal LR_S during the second normal active period NVA2. In one exemplary embodiment, the second normal frame N_FRAME2 may have a frequency of 180 Hz.

The second partial frame P_FRAME2 has a second partial active period PVA2 and a second partial blanking period PVB2. The right-eye odd-numbered line data O_RD are processed based on the odd-even identification signal OE_S during the second partial active period PVA2. In one exemplary embodiment, the second partial frame P_FRAME1 may have a frequency of 360 Hz.

The second normal active period NVA2 may be a period in which the right-eye data frame is processed, and the second partial active period PVA2 may be a period in which the odd-numbered line data or the even-numbered line data of the right-eye frame image is processed. The second normal blanking period NVB2 and the second partial frame P_FRAME2 may be a period in which the right-eye shutter of the shutter glasses is open and the left-eye shutter of the shutter glasses is closed.

The 3D load signal 3D_TP controls an output timing of the data voltage, that is, an output signal of the data driving part 230 in synchronization with the 3D data enable signal 3D_DE.

The 3D reversal signal 3D_REV controls a polarity of the data voltage. The 3D reversal signal 3D_REV may have a phase reversed every four frames. As shown FIG. 2B, the 3D reversal signal 3D_REV is reversed by a period which includes a first normal frame N_FRAME1, a first partial frame P_FRAME1, a second normal frame N_FRAME2 and a second partial frame P_FRAME2. In one exemplary embodiment, for example, the 3D reversal signal 3D_REV has same phase in the first and second normal frames N_FRAME1 and N_FRAME2 and has a same phase in the first and second partial frames P_FRAME1 and P_FRAME2.

The 3D vertical start signal 3D_STV has a frame cycle, and controls a start timing of the gate driving part 250. The 3D vertical start signal 3D_STV has a pulse of a high level during an early period of each of the first normal frame N_FRAME1, the first partial frame P_FRAME1, the second normal frame N_FRAME2 and the second partial frame P_FRAME2.

The first 3D gate clock signal 3D_CPV1 is a control signal to generate the odd-numbered gate signals. The second 3D gate clock signal 3D_CPV2 is a control signal delayed with respect to the first 3D gate clock signal 3D_CPV1 to generate the even-numbered gate signals. The first and second 3D gate clock signals 3D_CPV1 and 3D_CPV2 are activated based on the 3D data enable signal 3D_DE and the odd-even identification signal OE_S.

In one exemplary embodiment, for example, during the first and second partial active periods PVA1 and PVA2, when the odd-even identification signal OE_S is at the low level, the first 3D gate clock signal 3D_CPV1 is activated and the second 3D gate clock signal 3D_CPV2 is deactivated. In such an embodiment, the odd-numbered gate signals may be applied to the odd-numbered gate line of the display panel 100. In an alternative exemplary embodiment, during the first and second partial active periods PVA1 and PVA2, the odd-even identification signal OE_S may be at the high level, the second 3D gate clock signal 3D_CPV2 may be activated, and the first 3D gate clock signal 3D_CPV1 may be deactivated. In such an embodiment, the even-numbered gate signals may be applied to the even-numbered gate lines of the display panel 100.

Figure 3:
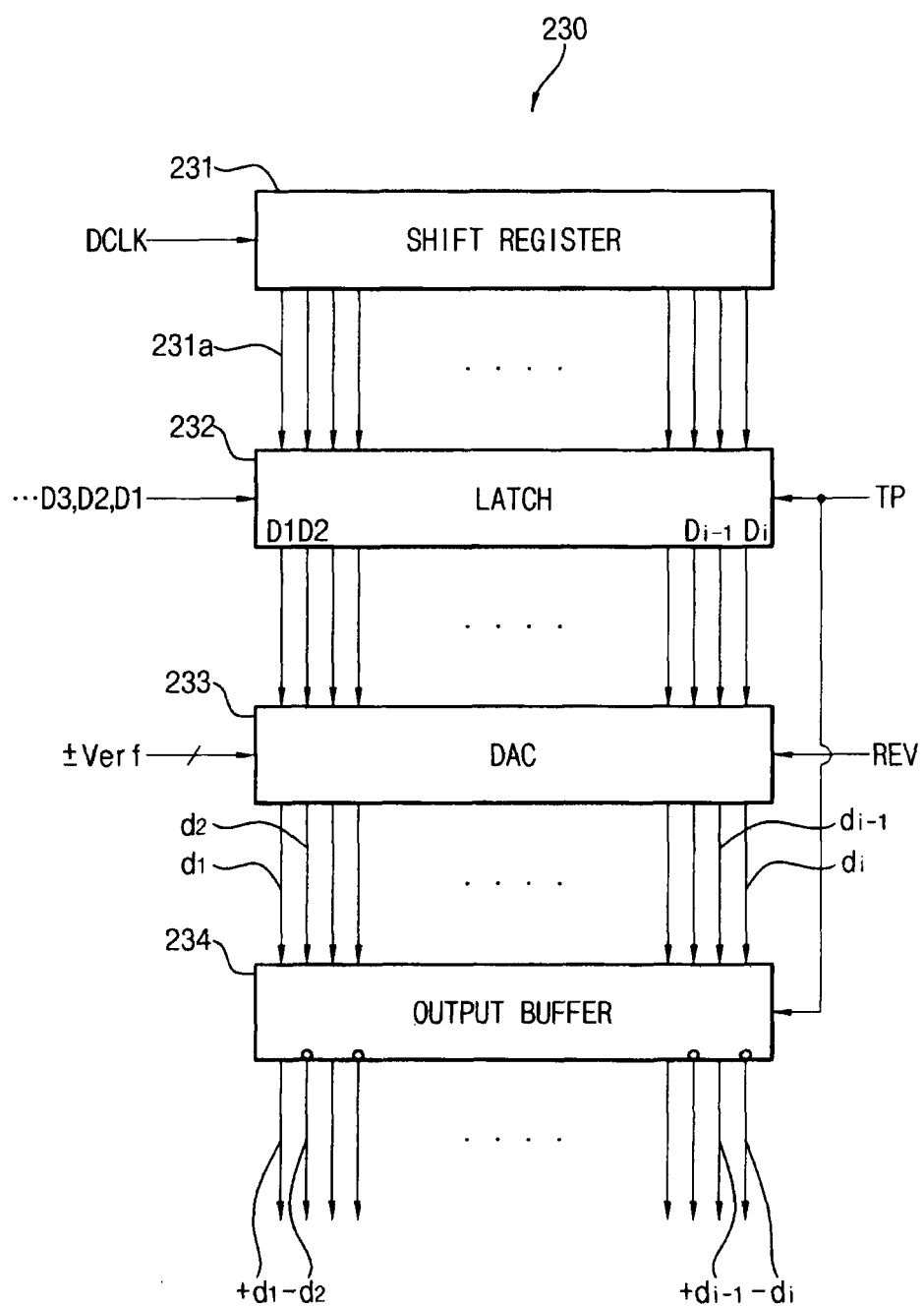
FIG. 3 is a block diagram illustrating an exemplary embodiment of a data driving part shown in FIG. 1.

FIG. 3 is a block diagram illustrating an exemplary embodiment of a data driving part shown in FIG. 1.

Referring to FIGS. 1 and 3, the data driving part 230 includes a shift register 231, a latch 232, a digital-to-analog converter ("DAC") 233 and an output buffer 234.

The shift register 231 provides a latch signal 231a to the latch 232 in parallel based on a data clock signal DCLK.

The latch 232 sequentially latches data D1, D2, . . . , Di−1 and Di in synchronization with the latch signal 231a (i is a natural number). The latch 232 latches the data D1, D2, . . . , Di−1 and Di on a line-by-line basis and outputs the latched data D1, D2, . . . , Di−1 and Di in response to the load signal TP.

The DAC 233 converts the data D1, D2, . . . , Di−1 and Di of the horizontal line unit into data voltages d1, d2, . . . , di−1 and di of the positive polarity (+) or the negative polarity (−) using gamma reference voltages±Vref of the positive polarity (+) or the negative polarity (−) based on the reversal signal REV, and outputs the data voltages d1, d2, . . . , di−1 and di of the positive polarity (+) or the negative polarity (−). In one exemplary embodiment, for example, the reversal signal REV controls the polarity of the data voltage on a line-by-line basis.

The output buffer 234 amplifies the data voltages d1, d2, . . . , di−1 and di and outputs the amplified data voltages d1, d2, . . . , di−1 and di. The output buffer 234 may control polarities of the data voltages of the lines based on a preset pixel (or dot) data unit. In one exemplary embodiment, for example, when one dot inversion mode is applied to the output buffer 234, the output buffer 234 reverses the polarities of the received data voltages, e.g., +d1, +d2, . . . , +di−1, +di, on a dot-by-dot basis outputs the data voltages which are revered as +d1, −d2, . . . , +di−1 and −di. In the illustrated exemplary embodiment, the output buffer 234 reverses the polarities of the data voltages on a dot-by-dot basis, e.g., the polarities of the data voltages are reversed every dot, but the invention is not limited thereto. In an alternative embodiment, the DAC 233 may reverse the polarity of the data voltages on a dot-by-dot basis.

Figure 4:
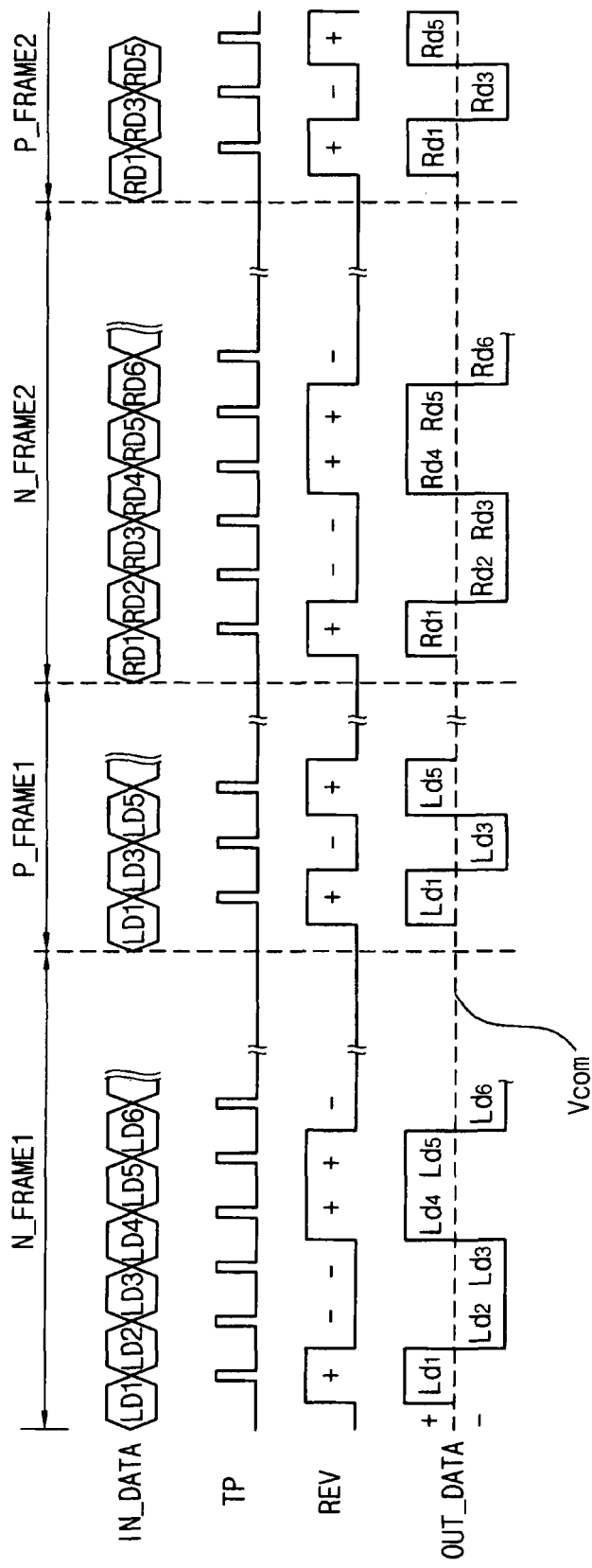
FIG. 4 is a signal timing diagram illustrating input and output signals of the data driving part shown in FIG. 3.

FIG. 4 is a signal timing diagram illustrating input and output signals of the data driving part shown in FIG. 3.

Referring to FIGS. 2B, 3 and 4, when the display apparatus is in the 3D stereoscopic image mode, the latch 232 receives left-eye data LD1, LD2, LD3, LD4, LD5, LD6, . . . in each horizontal period during the first normal frame N_FRAME1 (IN_DATA).

The latch 232 outputs the left-eye data LD1, LD2, LD3, LD4, LD5, LD6, . . . in each horizontal period to the DAC 233 in synchronization with the load signal TP.

The DAC 233 converts the left-eye data LD1, LD2, LD3, LD4, LD5, LD6, . . . into the data voltages +Ld1, −Ld2, −Ld3, +Ld4, +Ld5, −Ld6, . . . of the positive polarity (+) and the negative polarity (−) in response to the reversal signal REV, and outputs the data voltages +Ld1, −Ld2, −Ld3, +Ld4, +Ld5, −Ld6, . . . to the output buffer 234. During the first normal frame N_FRAME1, the reversal signal REV has a phase corresponding to the 1+2 dot inversion mode. In one exemplary embodiment, for example, the data voltage Ld1 of a first line has the positive polarity (+), the data voltages Ld2 and Ld3 of second and third lines have the negative polarity (−), the data voltages Ld4 and Ld5 of fourth and fifth lines have the positive polarity (+), and the data voltages Ld6 and Ld7 of sixth and seventh lines have the negative polarity (−). In such an embodiment, the reversal signal REV controls the polarity of the data voltage on a line-by-line basis.

The output buffer 234 amplifies the left-eye data voltages +Ld1, −Ld2, −Ld3, +Ld4, +Ld5, −Ld6, . . . and outputs the amplified left-eye data voltages +Ld1, −Ld2, −Ld3, +Ld4, +Ld5, −Ld6, . . . (OUT_DATA).

During the first partial frame P_FRAME1, the latch 232 receives the left-eye odd-numbered data LD1, LD3, LD5, . . . in each horizontal period (IN_DATA). The odd-numbered data correspond to the odd-numbered horizontal line.

The latch 232 outputs the left-eye odd-numbered data LD1, LD3, LD5, . . . in each horizontal period to the DAC 233 in synchronization with the load signal TP.

The DAC 233 converts the left-eye odd-numbered data LD1, LD3, LD5, . . . into the data voltages +Ld1, −Ld3, +Ld5, . . . of the positive polarity (+) and the negative polarity (−) in response to the reversal signal REV, and outputs the data voltages +Ld1, −Ld3, +Ld5, . . . of the positive polarity (+) and the negative polarity (−) to the output buffer 234. During the first partial frame P_FRAME1, the reversal signal REV has a phase corresponding to the one dot inversion mode. In one exemplary embodiment, for example, the data voltage Ld1 of the first horizontal line has the positive polarity (+), the data voltage Ld3 of the third horizontal line has the negative polarity (−), the data voltage Ld5 of the fifth horizontal line has the positive polarity (+), and the data voltage Ld7 of the seventh horizontal line has the negative polarity (−). In such an embodiment, the reversal signal REV controls the polarity of the data voltage on a line-by-line basis.

The output buffer 234 amplifies the left-eye odd-numbered data voltages +Ld1, −Ld3, +Ld5, −Ld7, . . . and outputs the amplified left-eye odd-numbered data voltages +Ld1, −Ld3, +Ld5, −Ld7, . . . (OUT_DATA).

The polarities of the left-eye odd-numbered data voltages +Ld1, −Ld3, +Ld5, −Ld7, . . . in the first partial frame P_FRAME1, are substantially the same as the polarities of the left-eye odd-numbered data voltages +Ld1, −Ld3, +Ld5, −Ld7, . . . in the first normal frame N_FRAME1. Therefore, a view difference between a left-eye image corresponding to the outputted data voltages during the first normal frame N_FRAME1 and a partial left-eye image corresponding to the outputted data voltages during the first partial frame P_FRAME1 is effectively prevented.

During the second normal frame N_FRAME2, the latch 232 receives right-eye data RD1, RD2, RD3, RD4, RD5, RD6, . . . in each horizontal period (IN_DATA).

The latch 232 outputs the right-eye data RD1, RD2, RD3, RD4, RD5, RD6, . . . in each horizontal period to the DAC 233 in synchronization with the load signal TP.

The DAC 233 converts the right-eye data RD1, RD2, RD3, RD4, RD5, RD6, . . . into the data voltages +Rd1, −Rd2, −Rd3, +Rd4, +Rd5, −Rd6, . . . of the positive polarity (+) and the negative polarity (−) in response to the reversal signal REV and outputs the data voltages +Rd1, −Rd2, −Rd3, +Rd4, +Rd5, −Rd6, . . . to the output buffer 234. During the second normal frame N_FRAME2, the reversal signal REV has a phase corresponding to the 1+2 dot inversion mode. In one exemplary embodiment, for example, the data voltage Rd1 of a first line has the positive polarity (+), the data voltages Rd2 and Rd3 of second and third lines have the negative polarity (−), the data voltages Rd4 and Rd5 of fourth and fifth lines have the positive polarity (+), and the data voltages Rd6 and Rd7 of sixth and seventh lines have the negative polarity (−). In such an embodiment, the reversal signal REV controls the polarity of the data voltage on a line-by-line basis.

The output buffer 234 amplifies the right-eye data voltages +Rd1, −Rd2, −Rd3, +Rd4, +Rd5, −Rd6, . . . and outputs the amplified right-eye data voltages +Rd1, −Rd2, −Rd3, +Rd4, +Rd5, −Rd6, . . . (OUT_DATA).

During the second partial frame P_FRAME2, the latch 232 receives the right-eye odd-numbered data RD1, RD3, RD5, . . . in each horizontal period (IN_DATA).

The latch 232 outputs the right-eye odd-numbered data RD1, RD3, RD5, . . . in each horizontal period to the DAC 233 in synchronization with the load signal TP.

The DAC 233 converts the right-eye odd-numbered data RD1, RD3, RD5, . . . into the data voltages +Rd1, −Rd3, +Rd5, −Rd7, . . . of the positive polarity (+) and the negative polarity (−) in response to the reversal signal REV and outputs the data voltages +Rd1, −Rd3, +Rd5, −Rd7, . . . of the positive polarity (+) and the negative polarity (−) to the output buffer 234. During the second partial frame P_FRAME2, the reversal signal REV has a phase corresponding to the one dot inversion mode. In one exemplary embodiment, for example, a data voltage Rd1 of the first line has the positive polarity (+), a data voltage Rd3 of the third line has the negative polarity (−), a data voltage Rd5 of the fifth line has the positive polarity (+), and a data voltage Rd7 of the seventh line has the negative polarity (−). In such an embodiment, the reversal signal REV controls the polarity of the data voltage on a line-by-line basis.

The output buffer 234 amplifies the right-eye odd-numbered data voltages +Rd1, −Rd3, +Rd5, −Rd7, . . . and outputs the amplified right-eye odd-numbered data voltages +Rd1, −Rd3, +Rd5, −Rd7, . . . (OUT_DATA).

The polarities of the right-eye odd-numbered data voltages +Rd1, −Rd3, +Rd5, −Rd7, . . . in the second partial frame P_FRAME2, are substantially the same as the polarities of the right-eye odd-numbered data voltages +Rd1, −Rd3, +Rd5, −Rd7, . . . in the second normal frame N_FRAME2. Therefore, a view difference between a right-eye image corresponding to the outputted data voltages during the second normal frame N_FRAME2 and a partial right-eye image corresponding to the outputted data voltages during the second partial frame P_FRAME2 is effectively prevented.

Although not shown in FIG. 4, in a third normal frame N_FRAME3, the reversal signal REV may have a phase corresponding to the 1+2 dot inversion mode (−, +, +, −, −, +, +, . . . ) opposite to the phase corresponding to the 1+2 dot inversion mode (+, −, −, +, +, −, −, . . . ) of the first normal frame N_FRAME1. In a third partial frame P_FRAME1, the reversal signal REV may have a phase corresponding to the 1 dot inversion mode (−, +, −, +, . . . ) opposite to the phase corresponding to the 1 dot inversion mode (+, −, +, −, . . . ) of the first partial frame P_FRAME1. In a fourth normal frame N_FRAME4, the reversal signal REV may have a phase corresponding to the 1+2 dot inversion mode (−, +, +, −, −, +, +, . . . ) opposite to the phase corresponding to the 1+2 dot inversion mode (+, −, −, +, +, −, −, . . . ) of the second normal frame N_FRAME2. In a fourth partial frame P_FRAME4, the reversal signal REV may have a phase corresponding to the 1 dot inversion mode (−, +, −, +, . . . ) opposite to the phase corresponding to the 1 dot inversion mode (+, −, +, −, . . . ) of the second partial frame P_FRAME2.

In an exemplary embodiment, the reversal signal REV may have a phase reversed every four frames.

In an exemplary embodiment, the polarities of the left-eye data voltages of the first normal frame N_FRAME1 are substantially the same as the polarities of the right-eye data voltages of the second normal frame N_FRAME2. The polarities of the left-eye odd-numbered (or even-numbered) data voltages of the first normal frame N_FRAME1 are substantially the same as the polarities of the left-eye odd-numbered (or even-numbered) data voltages of the first partial frame P_FRAME1. The polarities of the right-eye odd-numbered (or even-numbered) data voltages of the second normal frame N_FRAME2 are substantially the same as the polarities of the right-eye odd-numbered (or even-numbered) data voltages of the second partial frame P_FRAME2. In such an embodiment, display quality of a 3D stereoscopic image is substantially improved.

Figure 5:
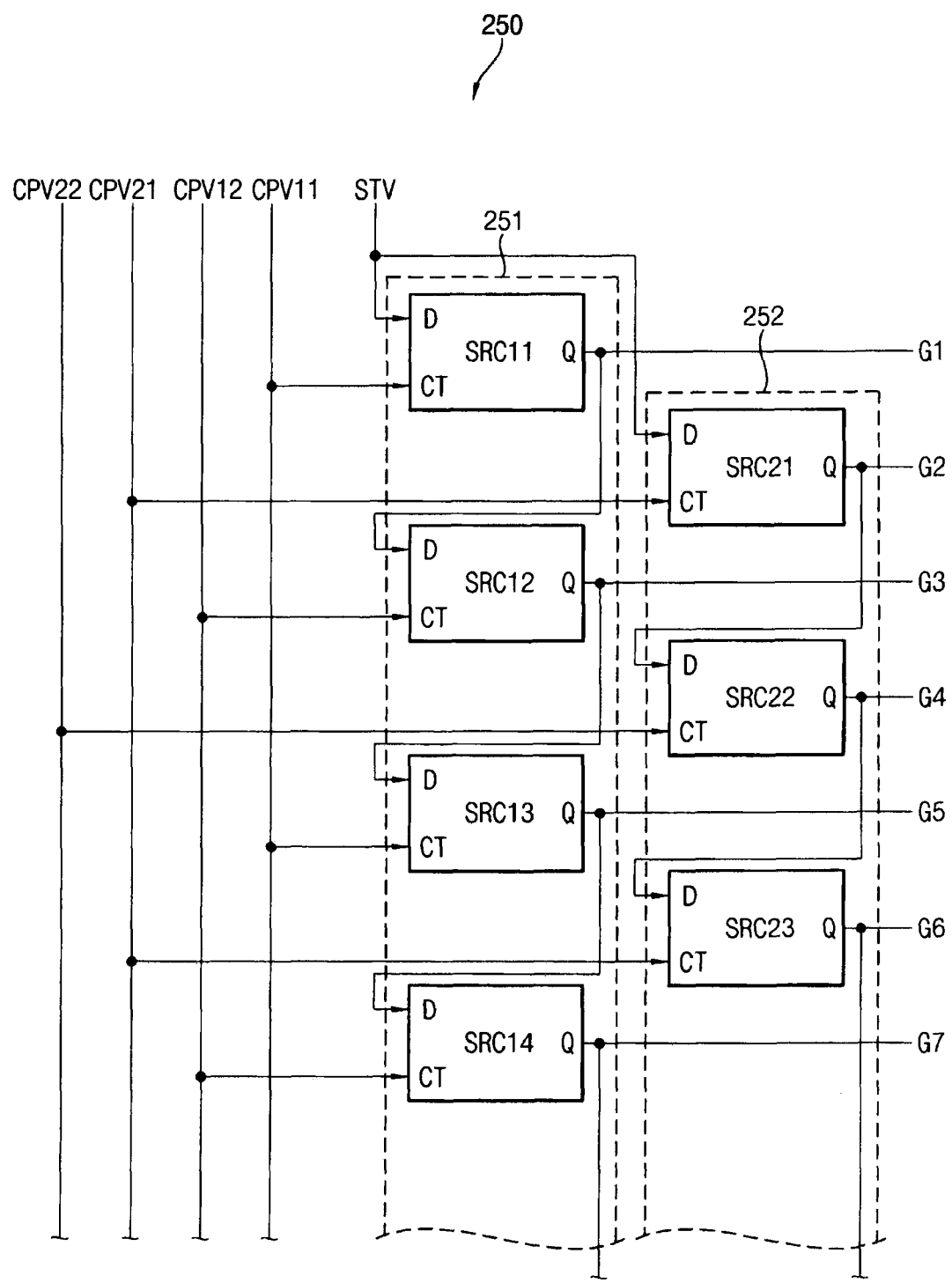
FIG. 5 is a block diagram illustrating an exemplary embodiment of a gate driving part shown in FIG. 1.

FIG. 5 is a block diagram illustrating an exemplary embodiment of a gate driving part shown in FIG. 1.

Referring to FIGS. 1 and 5, the gate driving part 250 includes a first sub gate circuit 251 and a second sub gate circuit 252.

The first sub gate circuit 251 includes a plurality of stages SRC11, SRC12, SRC13, . . . , and receives the vertical start signal STV and the first gate clock signal CPV1. The first gate clock signal CPV1 includes a first clock signal CPV11 and a second clock signal CPV12 having a phase opposite to a phase of the first clock signal CPV11.

Each of the stages SRC11, SRC12, SRC13, . . . includes an input terminal D, a clock terminal CT and an output terminal Q, and may be a data flip flop ("D-FF"). The input terminal D receives the vertical start signal STV or an output signal of one of previous stages. The clock terminal CT receives the first clock signal CPV11 or the second clock signal CPV12. In one exemplary embodiment, for example, an odd-numbered stage SRC11 may receive the first clock signal CPV11 and an even-numbered stage SRC12 may receive the second clock signal CPV12. The first clock signal CPV11 may be different from the second clock signal CPV12 and may be a signal delayed with respect to the second clock signal CPV12. The output terminal Q outputs a gate signal in synchronization with the first or second clock signal CPV11 or CPV12. The first sub gate circuit 251 sequentially outputs odd-numbered gate signals G1, G3, G5, . . . , Gn−1.

The second sub gate circuit 252 includes a plurality of stages SRC21, SRC22, SRC23, . . . and receives the vertical start signal STV and the second gate clock signal CPV2. The second gate clock signal CPV2 receives a third clock signal CPV21 and a fourth clock signal CPV22 having a phase opposite to the phase of the third clock signal CPV21.

Each of the stages SRC21, SRC22, SRC23, . . . includes the input terminal D, the clock terminal CT and the output terminal Q, and may be the D-FF. The input terminal D receives the vertical start signal STV or the output signal of one of previous stages. The clock terminal CT receives the third clock signal CPV21 or the fourth clock signal CPV22. In one exemplary embodiment, for example, an odd-numbered stage SRC21 may receive the third clock signal CPV21 and an even-numbered stage SRC22 may receive the fourth clock signal CPV22. The third clock signal CPV21 may be different from the fourth clock signal CPV22 and may be a signal delayed with respect to the fourth clock signal CPV22. The output terminal Q outputs the gate signal in synchronization with the third or fourth clock signal CPV21 or CPV22. The second sub gate circuit 252 sequentially outputs even-numbered gate signals G2, G4, G6, . . . , Gn.

Figure 6:
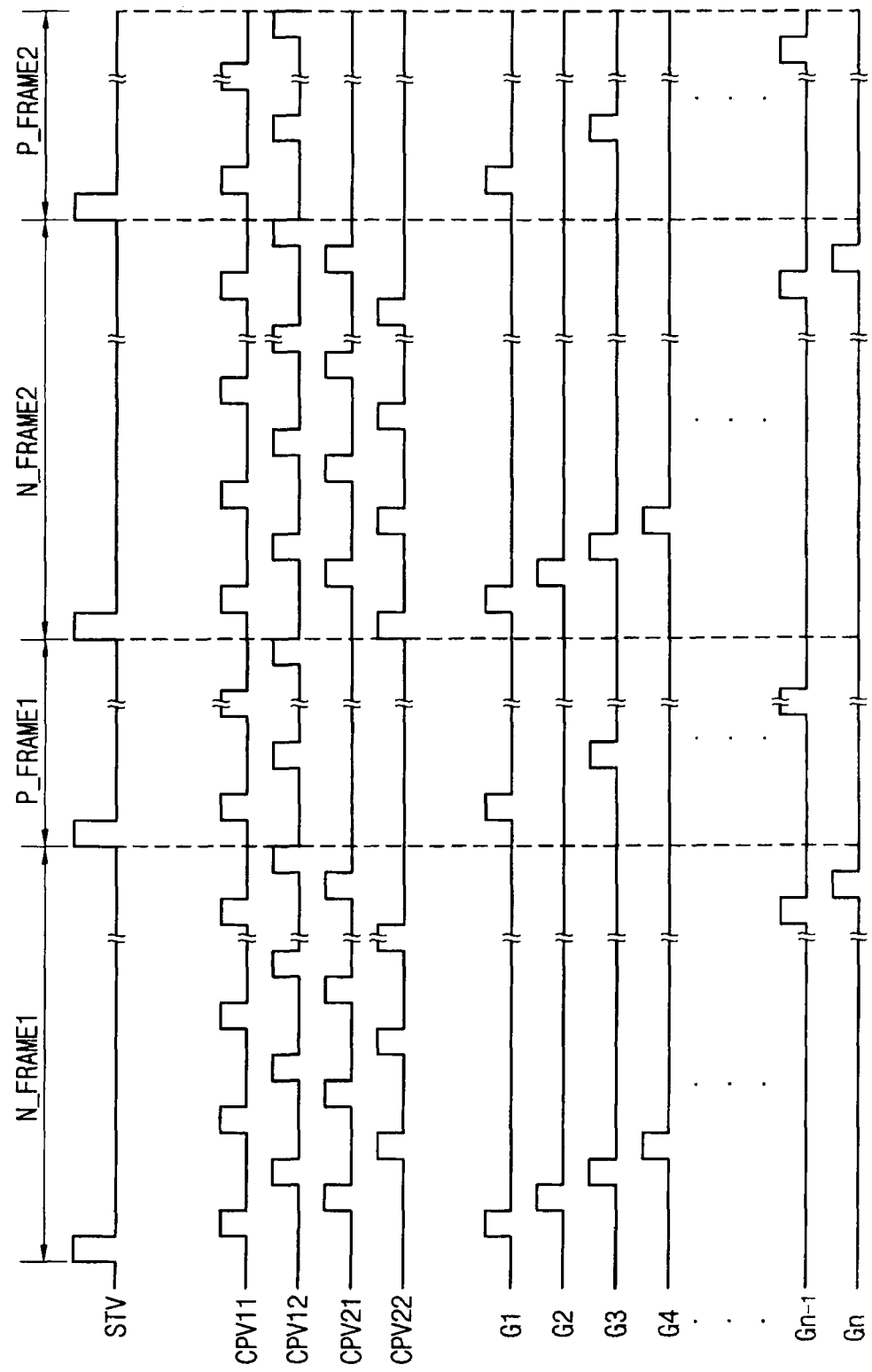
FIG. 6 is a signal timing diagram illustrating input and output signals of the gate driving part shown in FIG. 5.

FIG. 6 is a signal timing diagram illustrating input and output signals of the gate driving part shown in FIG. 5.

Referring to FIGS. 2B, 5 and 6, during the first normal frame N_FRAME1 of the 3D stereoscopic image mode, the gate driving part 250 receives the vertical start signal STV, the first clock signal CPV11, the second clock signal CPV12, the third clock signal CPV21 and the fourth clock signal CPV22.

The first sub gate circuit 251 operates in response to the vertical start signal STV and outputs the odd-numbered gate signals G1, G3, G5, . . . , Gn−1 based on the first and second clock signals CPV11 and CPV12.

The second sub gate circuit 252 operates in response to the vertical start signal STV and outputs the even-numbered gate signals G2, G4, G6, . . . , Gn based on the third and fourth clock signals CPV21 and CPV22.

Therefore, the left-eye data LD may be displayed on the display panel 100 during the first normal frame N_FRAME1.

During the first partial frame P_FRAME1, the gate driving part 250 receives the vertical start signal STV, the first clock signal CPV11 and the second clock signal CPV12, while the timing control part 270 does not provide the third and fourth clock signals CPV21 and CPV22 to the gate driving part 250.

The first sub gate circuit 251 operates in response to the vertical start signal STV and outputs the odd-numbered gate signals G1, G3, G5, . . . , Gn−1 based on the first and second clock signals CPV11 and CPV12, while the second sub gate circuit 252 does not output the even-numbered gate signals G2, G4, G6, . . . , Gn.

Therefore, the left-eye odd-numbered data O_LD may be displayed on the display panel 100 during the first partial frame P_FRAME1.

During the second normal frame N_FRAME2 of the 3D stereoscopic image mode, the gate driving part 250 receives the vertical start signal STV, the first clock signal CPV11, the second clock signal CPV12, the third clock signal CPV21 and the fourth clock signal CPV22.

The first sub gate circuit 251 operates in response to the vertical start signal STV and outputs the odd-numbered gate signals G1, G3, G5, . . . , Gn−1 based on the first and second clock signals CPV11 and CPV12.

The second sub gate circuit 252 operates in response to the vertical start signal STV and outputs the even-numbered gate signals G2, G4, G6, . . . , Gn based on the third and fourth clock signals CPV21 and CPV22.

In such an embodiment, the right-eye data RD may be displayed on the display panel 100 during the second normal frame N_FRAME2.

During the second partial frame P_FRAME2, the gate driving part 250 receives the vertical start signal STV, the first clock signal CPV11 and the second clock signal CPV12, while the timing control part 270 does not provide the third and fourth clock signals CPV21 and CPV22 to the gate driving part 250.

The first sub gate circuit 251 operates in response to the vertical start signal STV and outputs the odd-numbered gate signals G1, G3, G5, . . . , Gn−1 based on the first and second clock signals CPV11 and CPV12, while the second sub gate circuit 252 does not output the even-numbered gate signals G2, G4, G6, . . . , Gn.

Therefore, the right-eye odd-numbered data O_RD may be displayed on the display panel 100 during the second partial frame P_FRAME2.

FIGS. 7A, 7B and 7C are schematic diagrams illustrating an exemplary embodiment of a method of driving a display panel shown in FIG. 1.

As shown in Table 1 below, when the reversal signal REV has the phase corresponding to the 1+2 dot inversion mode during the normal frame, the reversal signal REV may have a phase corresponding to the one dot inversion mode during the partial frame.

TABLE 1

|  |  | NORMAL FRAME | PARTIAL FRAME(ODD) | PARTIAL FRAME(EVEN) |
| --- | --- | --- | --- | --- |
| Pixel | 1st LINE | (+) or (−) | (+) or (−) |  |
|  | 2nd LINE | (−) or (+) |  | (−) or (+) |
|  | 3rd LINE | (−) or (+) | (−) or (+) |  |
|  | 4th LINE | (+) or (−) |  | (+) or (−) |
|  | 5th LINE | (+) or (−) | (+) or (−) |  |
|  | 6th LINE | (−) or (+) |  | (−) or (+) |
|  | 7th LINE | (−) or (+) | (−) or (+) |  |
|  | 8th LINE | (+) or (−) |  | (+) or (−) |

Referring to Table 1 of FIG. 7A, the voltages may be charged in pixels included in an M-th pixel column of the display panel 100 in a polarity sequence of positive (+), negative (−), negative (−), positive (+), positive (+), negative (−), negative (−), positive (+), . . . based on the 1+2 dot inversion mode during the normal frame.

Referring to Table 1 and FIG. 7B, the voltages may be charged in pixels included in the M-th pixel column of the display panel 100 in a polarity sequence of positive (+), negative (−), positive (+), negative (−), . . . based on the one dot inversion mode during the partial frame processing odd-numbered data. Therefore, the odd-numbered data voltage of the normal frame and the partial frame may have the same polarities.

However, referring to Table 1 and FIG. 7C, the voltages may be charged in pixels included in the M-th pixel column of the display panel 100 in an order of negative (−), positive (+), negative (−), positive (+), . . . voltages based on the one dot inversion mode during the partial frame processing even-numbered data. Therefore, the even-numbered data voltage of the normal frame and the partial frame may have the same polarities.

FIGS. 8A, 8B and 8C are schematic diagrams illustrating an alternative exemplary embodiment of a method of driving a display panel according to the invention.

As shown in Table 2 below, when the reversal signal REV has the phase corresponding to the one dot inversion mode during the normal frame, the reversal signal REV may have a phase which is at the high level of the positive polarity (+) or the low level of the negative polarity (−) corresponding to a column inversion mode during the partial frame.

TABLE 2

|  |  | NORMAL FRAME | PARTIAL FRAME(ODD) | PARTIAL FRAME(EVEN) |
| --- | --- | --- | --- | --- |
| Pixel | 1st LINE | (+) or (−) | (+) or (−) |  |
|  | 2nd LINE | (−) or (+) |  | (−) or (+) |
|  | 3rd LINE | (+) or (−) | (+) or (−) |  |

TABLE 2-continued

|  | NORMAL FRAME | PARTIAL FRAME(ODD) | PARTIAL FRAME(EVEN) |
|---|---|---|---|
| 4th LINE | (−) or (+) |  | (−) or (+) |
| 5th LINE | (+) or (−) | (+) or (−) |  |
| 6th LINE | (−) or (+) |  | (−) or (+) |
| 7th LINE | (+) or (−) | (+) or (−) |  |
| 8th LINE | (−) or (+) |  | (−) or (+) |

Referring to Table 2 and FIG. 8A, the voltages may be charged in pixels included in an M-th pixel column of the display panel 100 in a polarity sequence of positive (+), negative (−), positive (+), negative (−), positive (+), negative (−), . . . voltages according to the 1 dot inversion mode during the normal frame.

Referring to Table 2 and FIG. 8B, the voltages may be charged in pixels included in the M-th pixel column of the display panel 100 in a polarity sequence of positive (+), positive (+), positive (+), positive (+), . . . based on the column inversion mode during the partial frame processing odd-numbered data. Therefore, the odd-numbered data voltage of the normal frame and the partial frame may have the same polarities.

However, referring to Table 2 and FIG. 8C, the voltages may be charged in pixels included in the M-th pixel column of the display panel 100 in a polarity sequence of negative (−), negative (−), negative (−), negative (−), . . . based on the column inversion mode during the partial frame processing even-numbered data. Therefore, the even-numbered data voltage of the normal frame and the partial frame may have the polarities substantially same with each other.

FIGS. 9A, 9B and 9C are schematic diagrams illustrating another alternative exemplary embodiment of a method of driving a display panel according to the invention.

As shown in Table 3 below, when the reversal signal REV has the phase corresponding to a 2 dot inversion mode during the normal frame, the reversal signal REV may have the phase corresponding to the 1 dot inversion mode during the partial frame.

TABLE 3

|  |  | NORMAL FRAME | PARTIAL FRAME(ODD) | PARTIAL FRAME(EVEN) |
|---|---|---|---|---|
| Pixel | 1st LINE | (+) or (−) | (+) or (−) |  |
|  | 2nd LINE | (+) or (−) |  | (+) or (−) |
|  | 3rd LINE | (−) or (+) | (−) or (+) |  |
|  | 4th LINE | (−) or (+) |  | (−) or (+) |
|  | 5th LINE | (+) or (−) | (+) or (−) |  |
|  | 6th LINE | (+) or (−) |  | (+) or (−) |
|  | 7th LINE | (−) or (+) | (−) or (+) |  |
|  | 8th LINE | (−) or (+) |  | (−) or (+) |

Referring to Table 3 and FIG. 9A, the voltages may be charged in pixels included in an M-th pixel column of the display panel 100 in a polarity sequence of positive (+), negative (−), negative (−), positive (+), positive (+), negative (−), negative (−), positive (+), . . . based on the 1+2 dot inversion mode during the normal frame.

Referring to Table 3 and FIG. 9B, the voltages may be charged in pixels included in the M-th pixel column of the display panel 100 in a polarity sequence of positive (+), negative (−), positive (+), negative (−), . . . based on the one dot inversion mode during the partial frame processing odd-numbered data. Therefore, the odd-numbered data voltage of the normal frame and the partial frame may have the same polarities.

However, referring to Table 3 and FIG. 9C, the voltages may be charged in pixels included in the M-th pixel column of the display panel 100 in a polarity sequence of positive (+), negative (−), positive (+), negative (−), . . . based on the one dot inversion mode during the partial frame processing even-numbered data. Therefore, the even-numbered data voltage of the normal frame and the partial frame may have the same polarities.

FIGS. 10A, 10B and 10C are schematic diagrams illustrating still another alternative exemplary embodiment of a method of driving a display panel according the invention.

As shown in Table 4 below, when the reversal signal REV has the phase corresponding to the column inversion mode during the normal frame, the reversal signal REV may have the phase corresponding to the column inversion mode during the partial frame.

TABLE 4

|  |  | NORMAL FRAME | PARTIAL FRAME(ODD) | PARTIAL FRAME(EVEN) |
|---|---|---|---|---|
| Pixel | 1st LINE | (+) or (−) | (+) or (−) |  |
|  | 2nd LINE | (+) or (−) |  | (+) or (−) |
|  | 3rd LINE | (+) or (−) | (+) or (−) |  |
|  | 4th LINE | (+) or (−) |  | (+) or (−) |
|  | 5th LINE | (+) or (−) | (+) or (−) |  |
|  | 6th LINE | (+) or (−) |  | (+) or (−) |
|  | 7th LINE | (+) or (−) | (+) or (−) |  |
|  | 8th LINE | (+) or (−) |  | (+) or (−) |

Referring to Table 4 and FIG. 10A, the voltages may be charged in pixels included in an M-th pixel column of the display panel 100 in a polarity sequence of positive (+), positive (+), positive (+), positive (+), positive (+), positive (+), positive (+), . . . based on the column inversion mode during the normal frame.

Referring to Table 4 and FIG. 10B, the voltages may be charged in pixels included in the M-th pixel column of the display panel 100 in a polarity sequence of positive (+), positive (+), positive (+), positive (+), positive (+), positive (+), positive (+), . . . based on the column inversion mode during the partial frame processing odd-numbered data. Therefore, the odd-numbered data voltage of the normal frame and the partial frame may have the same polarities.

However, referring to Table 4 and FIG. 10C, the voltages may be charged in pixels included in the M-th pixel column of the display panel 100 in a polarity sequence of positive (+), positive (+), positive (+), positive (+), positive (+), positive (+), positive (+), . . . based on the column inversion mode during the partial frame processing even-numbered data. Therefore, the even-numbered data voltage of the normal frame and the partial frame may have the same polarities.

According to the exemplary embodiments of the invention, in the 3D stereoscopic image mode, the reversal signal REV controls the polarity of the data voltage during the partial frame such that the polarity of the data voltage during the partial frame is equal to the polarity of the data voltage during the normal frame. Therefore, deterioration in display quality due to a view difference between an image displayed during the normal frame and an image displayed during the partial frame, such as a flicker and a horizontal line pattern, for example, are effectively prevented, and the display quality is thereby substantially improved.

The foregoing is illustrative of the invention and is not to be construed as limiting thereof. Although a few exemplary embodiments of the invention have been described, those skilled in the art will readily appreciate that many modifications are possible in the exemplary embodiments without materially departing from the novel teachings and advantages of the invention. Accordingly, all such modifications are intended to be included within the scope of the invention as defined in the claims. In the claims, means-plus-function clauses are intended to cover the structures described herein as performing the recited function and not only structural equivalents but also equivalent structures. Therefore, it is to be understood that the foregoing is illustrative of the invention and is not to be construed as limited to the specific exemplary embodiments disclosed, and that modifications to the disclosed exemplary embodiments, as well as other exemplary embodiments, are intended to be included within the scope of the appended claims. The invention is defined by the following claims, with equivalents of the claims to be included therein.

What is claimed is:

1. A method of driving a display panel, the method comprising:
outputting full horizontal line data voltages of a first-eye data frame to a plurality of data lines of the display panel in a first normal frame of a first frame; and
outputting partial horizontal line data voltages of the first-eye data frame to the plurality of data lines of the display panel in a first partial frame of the first frame;
outputting full horizontal line data voltages of a second-eye data frame to the plurality of data lines of the display panel in a second normal frame of a second frame; and
outputting partial horizontal line data voltages of the second-eye data frame to the plurality of data lines of the display panel in a second partial frame of the second frame,
wherein polarities of the partial horizontal line data voltages of the first-eye data frame in the first partial frame are substantially the same as polarities of partial horizontal line data voltages of the first-eye data frame outputted to the plurality of data lines in the first normal frame,
wherein an interval of the first partial frame is less than an interval of the first normal frame,
wherein the second normal frame and the second partial frame correspond to the first normal frame and the first partial frame, respectively, and
wherein polarities of the partial horizontal line data voltages of the second-eye data frame in the second partial frame are substantially the same as polarities of partial horizontal line data voltages of the second-eye data frame outputted to the plurality of data lines in the second normal frame.

2. The method of claim 1, further comprising:
generating a reversal signal having a phase reversed on a frame-by-frame basis,
wherein the frame includes the first normal frame, the first partial frame, the second normal frame and the second partial frame, and
wherein the reversal signal controls the polarity of the data voltage.

3. The method of claim 2, wherein
a phase of the reversal signal in the first normal frame is substantially equal to a phase of the reversal signal in the second normal frame, and
a phase of the reversal signal in the first partial frame is substantially equal to a phase of the reversal signal in the second partial frame.

4. The method of claim 3, wherein a partial horizontal line is an odd-numbered horizontal line or an even-numbered horizontal line of full horizontal lines in the display panel.

5. The method of claim 4, wherein the reversal signal has a phase corresponding to a 1+2 dot inversion mode in the first and second normal frames, and the reversal signal has a phase corresponding to a one dot inversion mode in the first and second partial frames.

6. The method of claim 4, wherein the reversal signal has a phase corresponding to a one dot inversion mode in the first and second normal frames, and the reversal signal has a phase corresponding to a column inversion mode in the first and second partial frames.

7. The method of claim 4, wherein the reversal signal has a phase corresponding to a two dot inversion mode in the first and second normal frames, and the reversal signal has the phase corresponding to a one dot inversion mode in the first and second partial frames.

8. The method of claim 4, wherein the reversal signal has a phase corresponding to a column inversion mode in the first and second normal frames, and the reversal signal has a phase corresponding to a column inversion mode in the first and second partial frames.

9. The method of claim 1, wherein the first normal frame has a frequency of 180 hertz and the first partial frame has a frequency of 360 hertz.

10. A display apparatus comprising:
a display panel including a plurality of data lines and a plurality of gate lines crossing the plurality of data lines; and
a data driving part which outputs full horizontal line data voltages of a first-eye data frame to the plurality of data lines of the display panel in a first normal frame of a first frame, and outputs partial horizontal line data voltages of the first-eye data frame to the plurality of data lines of the display panel,
wherein the data driving part outputs full horizontal line data voltages of a second-eye data frame to the plurality of data lines of the display panel in a second normal frame of a second frame, and
wherein the data driving part outputs partial line horizontal data voltages of the second-eye data frame to the plurality of data lines in a second partial frame of the second frame,
wherein polarities of the partial horizontal line data voltages of the first-eye data frame in a first partial frame of the first frame are substantially the same as polarities of partial horizontal line data voltages of the first-eye data frame outputted to the plurality of data lines in the first normal frame,
wherein an interval of the first partial frame is less than an interval of the first normal frame,
wherein the second normal frame and the second partial frame correspond to the first normal frame and the first partial frame, respectively, and
wherein polarities of the partial line horizontal data voltages of the second-eye data frame in the second partial frame are substantially the same as polarities of partial line horizontal data voltages of the second-eye data frame outputted to the plurality of data lines in the second normal frame.

11. The display apparatus of claim 10, further comprising:
a timing control part which generates a reversal signal having a phase reversed on a frame-by-frame basis,
wherein the frame includes the first normal frame, the first partial frame, the second normal frame and the second partial frame,
wherein the data driving part controls the polarity of the data voltage based on the reversal signal.

12. The display apparatus of claim 11, wherein
a phase of the reversal signal in the first normal frame is substantially equal to a phase of the reversal signal in the second normal frame, and
a phase of the reversal signal in the first partial frame is substantially equal to a phase of the reversal signal in the second partial frame.

13. The display apparatus of claim 12, wherein a partial horizontal line is an odd-numbered horizontal line or an even-numbered horizontal line of full horizontal lines in the display panel.

14. The display apparatus of claim 13, wherein the first normal frame has a frequency of 180 hertz and the first partial frame has a frequency of 360 hertz.

15. The display apparatus of claim 13, further comprising:
a gate driving part which outputs a plurality of gate signals to the plurality of gate lines,
wherein the gate driving part comprises:
a first sub gate circuit which outputs an odd-numbered gate signal to an odd-numbered gate line of the plurality of gate lines; and
a second sub gate which outputs an even-numbered gate signal to an even-numbered gate line of the plurality of gate lines.

16. The display apparatus of claim 15, wherein the timing control part provides a vertical start signal to the gate driving part during an early period of each of the first normal frame, the first partial frame, the second normal frame and the second partial frame.

17. The display apparatus of claim 15, wherein during each of the first and second normal frames, the timing control part provides a first clock signal and a second clock signal to the first sub gate circuit, and provides a third clock signal and a fourth clock signal to the second sub gate circuit,
wherein a phase of the first clock signal and a phase of the second clock signal are opposite to each other, and
wherein a phase of the third clock signal and a phase of the fourth clock signal are opposite to each other.

18. The display apparatus of claim 17, wherein during each of the first and second partial frames, the timing control part provides the first and second clock signals to the first sub gate circuit, or provides the third and fourth clock signals to the second sub gate circuit.

* * * * *